Nov. 21, 1933.   C. H. COLVIN ET AL   1,935,736
INDICATING INSTRUMENT
Filed May 10, 1930   2 Sheets-Sheet 1
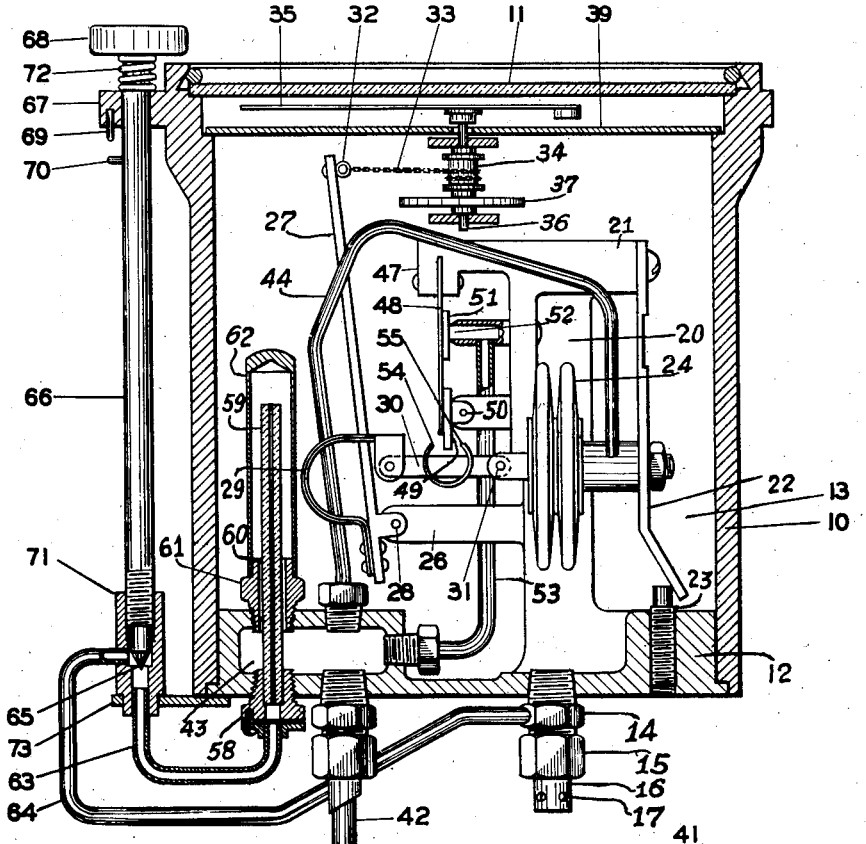
Fig-I
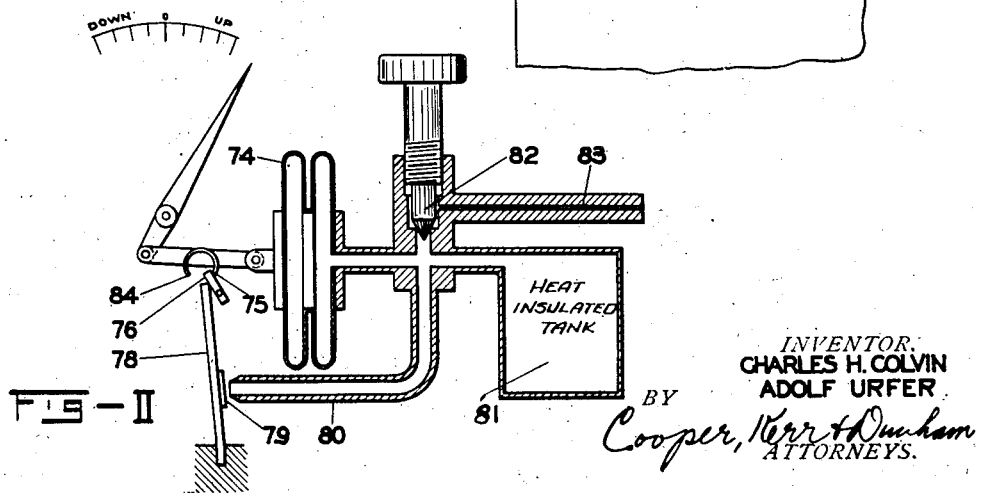
Fig-II
INVENTOR.
CHARLES H. COLVIN
ADOLF URFER
BY
Cooper, Kerr & Dunham
ATTORNEYS.

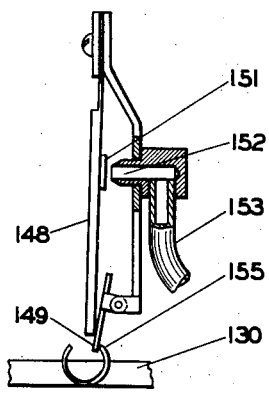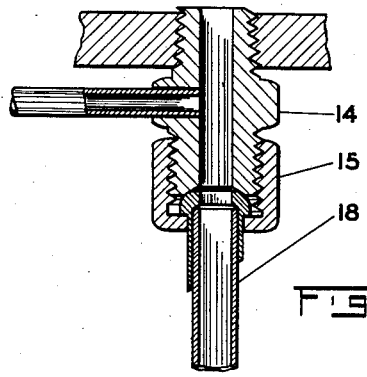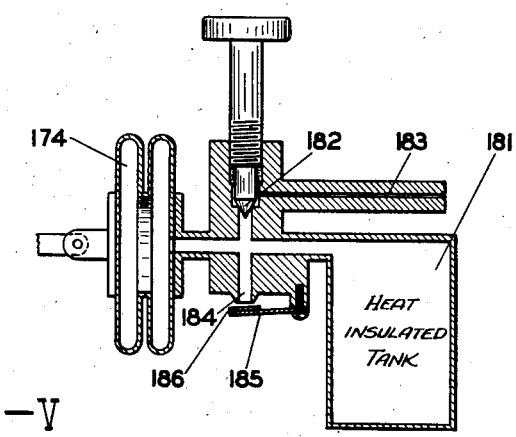

Patented Nov. 21, 1933

1,935,736

UNITED STATES PATENT OFFICE 1,935,736

INDICATING INSTRUMENT

Charles H. Colvin and Adolf Urfer, Brooklyn, N. Y., assignors to Pioneer Instrument Company, Incorporated, Brooklyn, N. Y., a corporation of New York Application May 10, 1930. Serial No. 451,256

11 Claims. (Cl. 264—1)

This invention relates to instruments which are responsive to differential pressure and particularly to such instruments which are used on aircraft for indicating altitude or the changes in altitude which occur during flight.

Among the objects of the invention is to provide in instruments of the classes referred to, mechanism for preventing the pressure operable upon the expansible diaphragm chamber or box of such an instrument from exceeding a predetermined limit. This object has in view the provision of protecting expedients desirable for preventing injury to the relatively lightly constructed expansible diaphragm chamber likely to occur because of excessive pressure or movement and also for ensuring the use of such an instrument for the purpose and conditions under which it was designed to operate. In addition to affording protection to the instrument in a physical sense this feature of the invention contributes to the dependability of the instrument in service and to the safety of travel in air.

Another object of this invention is to provide an instrument of the classes referred with means for automatically relieving the effect of the differential pressure which is operative upon the expansible diaphragm chamber or box of the instrument when certain conditions which are likely to arise prevail.

Another object of the invention is to provide an instrument subject to the control of differential pressure which has provisions rendering it readily convertible from a sensitive altimeter to a rate of climb instrument, and vice versa.

With these and incidental objects in view the invention consists of certain novel features of construction and combination of parts, the essential elements of which are set forth in the appended claims and a preferred form of embodiment of which is described hereinafter with reference to the drawings which accompany and form part of the specification.

In the drawings:

Fig. I is a view, partly in section, illustrating the preferred form of the invention.

Fig. II is a diagrammatic showing of mechanism by which the expansible chamber of the instrument may be automatically placed in communication with the atmosphere.

Fig. III is a detail illustrating a valve connection in a position to admit the passage of air to and from the expansible chamber.

Fig. IV is a detail of one form of connection between the casing of the instrument and a conduit leading to the atmosphere.

Fig. V is a diagrammatic representation of parts of an instrument provided with means for permitting communication of the expansible chamber with the atmosphere when the air contained within the chamber exceeds a predetermined pressure.

Rate of climb instruments and altimeters as used on aircraft, while utilizing the principles of differential pressure operative upon an expansible diaphragm chamber and thus similar in this respect to the commonly known form of aneroid barometer, yet, their use requires that they be characteristically different in structure and operation from the aneroid barometer. In general, the diaphragm chamber may be formed of a plurality of diaphragms soldered or otherwise fastened to each other and so related as to cause by their movement, the operation of an indicating hand which is visible to the pilot. In both a sensitive altimeter and a rate of climb instrument the interior of the expansible chamber contains air and the chamber is, therefore, subject to pressure both from within and without. Changes in altitude sometimes occur but slowly and the instrument which is depended upon for indicating the fact that a change of altitude is taking place must be sufficiently sensitive to indicate even the slightest change, be the instrument an altimeter or an instrument for indicating the rate of ascent or of descent.

Accordingly, the diaphragms of the diaphragm chamber and the chamber itself must be so constructed as to have little resistance to motion upon being subjected to a differential pressure even though the differential pressure be slight. It is therefore apparent that when such an instrument is carried by an aircraft, which, for example, is caused to descend very rapidly as is often necessary in combat maneuvers, the quick increase of the atmospheric pressure to which the instrument is subjected is likely to cause the collapse of the diaphragm chamber to a degree which might exceed the elastic limit of its metallic material before any manual adjustment could be resorted to to prevent such an occurrence. Such a result might be disastrous to the future accuracy of an instrument which is designed for indicating rate of climb or rate of descent.

A sensitive altimeter is frequently reset at a given elevation or datum and thereafter measures the altitude in reference to that datum. Because of the nature of the instrument if a given distance from that datum is exceeded, the expansible portion of the diaphragm chamber might be caused to exceed its elastic limit. It is, therefore, desirable that such an instrument be provided with means for automatically venting the expansible chamber to the prevailing atmospheric pressure whenever either the pressure within the chamber exceeds a safe limit or whenever the elastic walls of the chamber exceed a predetermined limit of movement.

In Fig. I, we have illustrated an instrument of the character referred to which is convertible from a rate of climb instrument to a sensitive altimeter, and vice versa. This instrument is provided with means for preventing injury thereto upon the occurrence of some of the conditions alluded to. The instrument comprises a casing 10 which is closed at one end by a glass 11 and at its rear end by a wall 12. These members in effect enclose a chamber 13 which is always subjected to atmospheric pressure. However, it is frequently important that this chamber be in communication with the atmosphere only at a predetermined place or places.

The instrument casing illustrated has an opening in its rear wall in which is fitted one end of a fitting 14, the other end of which has fastened thereto by a union 15, an outlet member 16. This outlet member has a plurality of openings 17 which permit free communication with the atmosphere of the interior of the chamber defined by the casing. The construction of the fitting and union may best be seen in Fig. IV. It frequently occurs that it is desirable to cause communication of the interior of the casing with the atmosphere at some place other than at the rear of the instrument, as illustrated in Fig. I. In that event in place of the outlet member 16 a tube 18 may be connected to the fitting by means of the union as illustrated in Fig. IV, and for the purpose of this disclosure this latter tube may be considered as an outlet member having connection with the atmosphere.

The wall 12 is independent of the remaining walls of the casing and its attached pieces may be assembled thereon and tested before connection with the casing. The wall 12 carries a post 20 from which a boss 21 extends. This boss carries one end of a spring member 22 whose other end is maintained in an adjusted position by the end of a set screw 23. The expansible diaphragm chamber 24 is carried by spring member 22 to which one end of the expansible diaphragm chamber is secured in any well-known manner. The other end of the expansible diaphragm chamber moves in relation to its fixed end upon the occurrence of changes in differential pressure.

Post 20 also has extending therefrom an arm 26 which carries at its end a lever 27 pivotally mounted on pin 28. This lever has one arm 29 pivotally connected to a link 30, whose other end is connected at 31 to the movable end of the diaphragm chamber 24. The other arm of lever 27 has connected to its free end at 32 a flexible member 33 a portion of which is wound about a drum 34. The position of the lever 27 is under the control of the yielding wall or walls of the diaphragm chamber and is caused to follow the movement of the yielding wall which controls the position of the indicating hand 35. This indicating hand together with drum 34 is mounted for rotation with and upon a shaft 36.

A hair spring 37 has one end connected to the shaft and its other end fixed. Its action causes all slack to be taken up between the free end of the lever 27 and the indicating hand 35. 39 is a dial plate which bears an appropriate scale for the instrument.

The instrument thus far described has utility as an altimeter but for the purpose of increasing the effective volume of inclosed air active from within the interior of the expansible diaphragm chamber a heat insulated tank 41 is provided. This heat insulated tank is connected by a conduit 42 through chamber 43 and conduit 44 with the expansible chamber. So much of the instrument with or without the tank connected therewith is useful as an altimeter. The chamber 43 may be defined as a common chamber to and from which lead all of the conduits necessary for associating various elements of the instrument. In this connection it constitutes a convenient means for enabling the interconnection of the several conduits or tubes desired to be connected in the present form of convertible instrument and is an adjunct of considerable value for it contributes to the simplicity of an instrument, which, with slight alterations may be used to perform in dual capacities. The means for automatically venting the expansible chamber to the atmosphere when said chamber exceeds a predetermined limit of movement, will now be described.

Post 20 carries an arm 47 to which is fastened one end of a resilient member 48. The free end of member 48 normally rests upon the plate 49 which is pivotally mounted at 50. Between the free end of the resilient member 48 and its fixed end there is an element 51 which normally closes the open end 52 of a conduit or tube 53. This tube 53 is in communication with chamber 43 and is, therefore, always in communication with the interior of the diaphragm chamber 24 through the tube 44. The elements 51, 52, and 53 just described constitute the valve connection which is normally closed but which may be opened by expansion of diaphragm 24 beyond a predetermined safe limit for permitting communication of the interior of the diaphragm chamber with the atmosphere under certain conditions as, for example, when the pressure inside of the diaphragm becomes excessive, thereby preventing a leak or a complete rupture in the diaphragm walls and/or preventing the diaphragm from expanding beyond its elastic limit. Link 30 carries a pair of fingers 54, 55, the spacing of which determines the selected extreme limits of travel of the yielding wall of the diaphragm chamber in both directions. Of course, the spacing of the fingers 54, 55, is determined by the design of the instrument and the use to which it is to be put. Finger 55 is so positioned as to contact the lower end of plate 49 when the expansible diaphragm chamber has moved to a limit beyond which is not desired to be permitted to further expand and finger 54 is so positioned as to contact the other side of plate 49 when the diaphragm chamber has contracted to a limit beyond which it is desired that no further contraction take place.

Whenever either finger 54 or finger 55 contacts the lower end of plate 49, plate 49 will be pivoted about its fulcrum 50 and will cause the free end of the resilient member 48 to be displaced from its normal position. Upon the happening of this event the opening at 52 will no longer be sealed from communication with the atmosphere by element 51 with the result that the interior of the diaphragm chamber 24 will be immediately vented to atmospheric pressure through tube 44, chamber 43, and tube 53. It therefore is apparent that the valve connection will operate to prevent the movement of the diaphragm chamber from exceeding a predetermined limit in either direction or in both directions depending upon whether only one or both of the fingers 54, 55 are utilized. Since the movement of the diaphragm chamber is, primarily, a function of the differential pressure active thereon, other factors being taken care of by calibration, it is apparent that the predetermined opening of the valve may be determined from either the pressure not desired to be exceeded or the movement which such pressure causes.

When finger 54 operates upon pivot-plate 49 to open the valve, air enters tube 53, since the movement of the diaphragm chamber to cause this effect has resulted from excessive pressure from without the diaphragm chamber. When finger 55 operates upon pivot-plate 49 to open the valve, air leaves the tube 53, since the movement of the diaphragm chamber to cause this effect has resulted from excessive pressure from within diaphragm chamber. Obviously, the former movement will result when the sensitive altimeter has been exposed to a too great an atmospheric pressure and the latter movement will result when the sensitive altimeter has been exposed to a too low an atmospheric pressure. When used on aircraft, the opening of the valve would occur when the aircraft has descended below a certain predetermined elevation and when it has risen above a certain predetermined elevation, and the opening of the valve would in either case serve to prevent injury to the instrument such as might result from distorting or straining the walls of the diaphragm chamber or the material of the diaphragm chamber beyond its elastic limit or a safe working limit.

It is understood, of course, that the sensitive altimeter functions with air contained within its diaphragm chamber and that the limits of movement of the diaphragm chamber are entirely dependent upon the differential pressure existing and the strength of the walls of the chamber so long as there is not permitted any passage of air from or to the chamber. The pressure of the air within the chamber may be made to correspond with the atmospheric pressure at any desired elevation which is thereafter identified as the datum or reference elevation. This may be done by a valve which may be opened sufficiently long for permitting equalization of the pressure within and without the diaphragm chamber at the given elevation. After the valve is closed, all of the expansive and contractive effort of the air confined is then operative upon the diaphragm chamber and causes its movement.

The capillary tube is a necessary element of a rate of climb instrument and when the device of the present invention is assembled for use as a rate of climb instrument, the capillary tube serves to provide a restricted passage for air between chamber 43 (and associated containers) and the free atmosphere. Air may flow out of chamber 43, the diaphragm chamber, and tank through passage 60 between the bore of fitting 61 and the capillary tube 59, into cap 62, through the orifice of the capillary tube 59 and thence through conduit 63, and conduit 64. The latter tube is connected directly with the fitting 14 and with the free atmosphere through openings in the outlet member 16. It will be apparent that when the device is operating as a rate of climb instrument, the pressure within the tank 41, and consequently the pressure within the diaphragm chamber 24 is equal to the pressure existing at the particular altitude at which the device may be, owing to the capillary 59 through which an may pass, and the pointer 35 will read zero no matter what the actual pressure is at that time. When, however, the pressure outside of the casing 10 increases or decreases, the difference in pressure between that within the diaphragm chamber 24 and that which exists in the casing 10 by virtue of the outlet member 16, tends to be equalized by a flow of air through the capillary. On account of the resistance of the capillary, however, the flow of air is admitted to or rejected from the diaphragm box very slowly and the pressures do not equalize immediately. Such difference in pressure effects an expansion or contraction of the diaphragm chamber in proportion to the decrease or increase of the atmospheric pressure. The faster the change of atmospheric pressure, the greater will be the difference in pressure between the interior of the diaphragm chamber 24 and the atmosphere since it is well known that the flow of a fluid through a small orifice is approximately directly proportional to the difference in pressure on the two sides of the orifice. It is therefore obvious that in such case there will be a greater expansion of the diaphragm and consequently a greater movement of the indicating hand 35.

Upon a slow ascent of the craft on which the device may be mounted, a reading on the scale 39 will show the indicating hand 35 at a certain mark which denotes that the craft is ascending at a certain rate which will be designated as slow. During a rapid ascent, a reading on the dial will show a greater movement of the indicating hand, denoting that the craft is ascending at a higher rate.

A needle valve 65 is provided at the jointure of conduits 63 and 64 and this valve may be used for adjusting the degree of opening at this place. It may also be used to shut off communication of chamber 43 through the capillary tube with the atmosphere when the instrument, assembled with all of its constituent elements, is desired to be used as a sensitive altimeter. That is, instead of replacing the fitting 58 by a valve, needle valve 65 may serve the same purpose. Needle valve 65 is supported at its front end by a journal 67. It carries at its front end a hand-wheel 68 conveniently accessible to a user of the instrument. Journal 67 is a part of the ring which bears upon the instrument board when the instrument is in place and all portions of the instrument rearward of this ring are concealed from view. Pins 69, 70 limit the distance that the stem 66 may be screwed out of its socket 71 and the spring 72 is provided for insuring a sufficient amount of friction to maintain the needle valve in its place of adjustment. It is apparent that the needle valve may be readily assembled or removed and for such purpose, bracket 73 may be detachable.

In Fig. III, we have illustrated a modified form of construction which may replace similar parts just described in connection with Fig. I. The valve is shown as being open because of the movement of link 130 a sufficient extent to cause finger 155 to rock pivot-plate 149 and thereby displace resilient member 148 from its normal position. Element 151 has been displaced from its seated relation over the opening 152 and the equalization of the pressure of the air within the tube 153 and the atmosphere is thereby made possible.

In Fig. II, we have diagrammatically illustrated the co-acting members of the instrument when used as a sensitive altimeter and when the existing atmospheric pressure is less than the limit beyond which the instrument should not be used without re-adjustment.

In this arrangement the yielding wall of the diaphragm chamber 74 has expanded to the maximum expanding limit and finger 75 has caused the rotation of a lever 76 in such a manner as to displace resilient member 78 from its normal position. The valve element 79 is accordingly displaced from the open end of the conduit 80 and the pressure within the conduit, the diaphragm chamber and tank 81 has been relieved. Valve 82 is shown closed and, as hereinbefore explained, this valve, in its closed position, cuts out the capillary tube 83 from taking any useful part in the operation of the sensitive altimeter. Upon the contraction of the diaphragm 74 beyond a permissible limit, finger 84 would contact the other side of the up-standing arm of lever 76 and rotate the lever clockwise with the result that the downwardly extending arm of the lever would displace the resilient member 78 to a position similar to that shown. The dial illustrated indicates the datum point as zero and proper legends appear for indicating whether or not the aircraft carrying the instrument has ascended or descended from this particular datum.

In Fig. V, we have illustrated the essential parts of either a rate of climb instrument or an altimeter of the type constituting the subject-matter of the present invention and a valve connection including a valve means which is automatically operative under the control of the pressure confined within the diaphragm chamber. The diaphragm chamber 174, tank 181, valve 182 and capillary tube 183 are similar to the corresponding members just described in connection with the description of the construction illustrated in Fig. II. However, a valve having an opening at 184 is provided to permit the venting of the confined volume whenever the pressure therein exceeds a predetermined amount. This predetermined amount is dependent upon the strength of the resilient member 185 which carries a closing element 186 adapted to close the valve opening 184. The pressure required to displace resilient member 185 from its normal position is a function of the strength of the diaphragm chamber to withstand the pressure acting from within the chamber. It should also be appreciated that if the movement of this diaphragm chamber is desired to be limited an abutment may be provided for physically preventing the movement of the yielding wall of the diaphragm beyond a predetermined position. Such an abutment will cause the pressure to build up very rapidly within the diaphragm chamber after its movement has been impeded with the result that the resilient member 185 and closing element 186 would be immediately displaced and permit relief of the pressure.

While we have disclosed a preferred embodiment of our invention and several modified forms thereof, we desire it to be understood that the invention is capable of wide variation and relationship of parts without departure from the nature and principles thereof and that such variation may include changes in the relation of the various parts either when the features of the present invention are used in connection with an instrument which is convertible from a sensitive altimeter into a rate of climb instrument and vice versa or as a rate of climb instrument alone or as a sensitive altimeter alone. In the latter two cases many features which are desirably constructed so as to be adaptable for standardization for use in two or three kinds of instruments may be altered or omitted depending upon the use to which the instrument is to be put, while at the same time making use of the principles of the invention.

Therefore, we do not restrict ourselves unessentially in the foregoing or other particulars but contemplate such alterations and modifications within the scope of the appended claims as may be found desirable.

We claim:

1. The combination in an indicating instrument, of an expansible diaphragm forming a chamber responsive to changes in atmospheric pressure, means including a valve connection in communication with said chamber, a spring arm normally overlying and closing the opening of said valve connection, a member pivotally mounted adjacent and in contact with said spring arm, means adapted to engage said member and controlled by the movement of said expansible diaphragm for actuating said member to displace said arm from the opening of the valve connection when a wall of the diaphragm moves beyond a predetermined limit.

2. In an indicating instrument responsive to the influence of atmospheric pressure, the combination of a casing, an expansible diaphragm mounted in said casing and forming an expansible chamber, movement of the yielding wall of said chamber being produced by differential pressure owing to the air within and without said chamber, an outlet for venting said casing to the atmosphere, a capillary tube in said casing for connecting the interior of the diaphragm chamber to the atmosphere, a valve for controlling said connection of the capillary tube, a tank exterior of said casing, a safety valve for said expansible diaphragm and actuated by expansion of the latter when an excessive pressure occurs therewithin, means forming an auxiliary chamber in said casing and having a plurality of openings, said capillary tube having one end thereof secured in one of said openings, a cap secured in another of said openings and encasing the other end of the capillary tube and having passages placing said capillary tube in communication with the auxiliary chamber, a conduit connecting the secured end of the capillary tube with its controlling valve, and other conduits connected to the remaining openings of said auxiliary chamber and to the diaphragm chamber, to the safety valve and to the tank, respectively.

3. In an indicating instrument responsive to the influence of atmospheric pressure, the combination comprising a casing, an expansible diaphragm mounted therein and forming an expansible chamber, the movement of the yielding wall of said chamber being responsive to differential pressure due to the air within and without the chamber, an outlet member communicating said casing with the atmosphere, a common chamber having connection with said diaphragm chamber, and means connecting said common chamber with said outlet member, said means including a capillary tube.

4. In an indicating instrument responsive to the influence of atmospheric pressure, the combination comprising a casing, an expansible diaphragm mounted therein and forming an expansible chamber, the movement of the yielding wall of said chamber being responsive to differential pressure due to the air within and without the chamber, an outlet member communicating said casing with the atmosphere, a common chamber having connection with said diaphragm chamber, means connecting said common chamber with said outlet member, and valve means interposed in said means.

5. In an indicating instrument responsive to the influence of atmospheric pressure, the combination comprising a casing, an expansible diaphragm mounted therein and forming an expansible chamber, the movement of the yielding wall of said chamber being responsive to differential pressure due to the air within and without the chamber, an outlet member communicating said casing with the atmosphere, a common chamber having connection with said diaphragm chamber, means connecting said common chamber with said outlet member, said means including a capillary tube, and valve means for controlling the passage of air through said connecting means.

6. In an indicating instrument responsive to the influence of atmospheric pressure, the combination comprising a casing, an expansible diaphragm mounted therein and forming an expansible chamber, the movement of the yielding wall thereof being responsive to differential pressure due to the air within and without the chamber, an outlet member for venting said casing to the atmosphere, valve means, a tank, means including a capillary tube connecting said diaphragm chamber with said outlet member through said valve means, and means connecting said diaphragm chamber to said tank.

7. In an indicating instrument responsive to the influence of atmospheric pressure, the combination comprising a casing, an expansible diaphragm mounted therein and forming an expansible chamber, the movement of the yielding wall thereof being responsive to differential pressure due to the air within and without the chamber, an outlet member for venting said casing to the atmosphere, a common chamber having openings adapted to receive fittings for connecting the common chamber with conduits, said openings being engaged by at least one fitting supporting the conduit which leads to the diaphragm chamber and another fitting supporting a capillary tube and conduit means leading to the outlet member.

8. In an indicating instrument responsive to the influence of atmospheric pressure, the combination comprising a casing, an expansible diaphragm mounted therein and forming an expansible chamber, the movement of the yielding wall thereof being responsive to differential pressure due to the air within and without the chamber, an outlet member for venting said casing to the atmosphere, a common chamber having openings adapted to receive fittings for connecting the common chamber with conduits, said openings being engaged by at least one fitting supporting the conduit which leads to the diaphragm chamber and another fitting supporting a capillary tube, valve means, a conduit connecting said last named fitting with said valve means, and another conduit on the other side of said valve means and having connection with said outlet member and the atmosphere.

9. In an indicating instrument responsive to the influence of atmospheric pressure, the combination comprising a casing, an expansible diaphragm mounted therein and forming an expansible chamber, the movement of the yielding wall thereof being responsive to differential pressure due to the air within and without the chamber, an outlet member for venting said casing to the atmosphere, a common chamber having openings adapted to receive fittings for connecting the common chamber with conduits, said openings being engaged by at least one fitting supporting the conduit which leads to the diaphragm chamber and another fitting supporting a capillary tube and conduit means leading to the outlet member, said conduit means having a valve therein for controlling the rate of flow therethrough, and means operable from the face of the instrument for controlling the adjustment of said valve.

10. In an indicating instrument responsive to the influence of atmospheric pressure, the combination comprising a casing having a wall independent of the remaining walls of the casing but supported thereby, an expansible diaphragm carried by said wall and forming an expansible chamber, the movement of the yielding wall of said chamber being responsive to differential pressure due to the air within and without the chamber, an outlet member in said wall for venting the casing to the atmosphere, a common chamber associated with said wall, said common chamber having openings adapted to receive fittings for connecting the common chamber with conduits, said openings being engaged by at least one fitting supporting the conduit which leads to the diaphragm chamber and another fitting supporting a capillary tube and conduit means leading to the outlet member.

11. In an indicating instrument responsive to the influence of atmospheric pressure, the combination comprising a casing having a wall independent of the remaining walls of the casing but supported thereby, an expansible diaphragm carried by said wall and forming an expansible chamber, the movement of the yielding wall of said chamber being responsive to differential pressure due to the air within and without the chamber, an outlet member in said wall for venting the casing to the atmosphere, a common chamber associated with said wall, said common chamber having openings adapted to receive fittings for connecting the common chamber with conduits, said openings being engaged by at least one fitting supporting the conduit which leads to the diaphragm chamber and a removable fitting supporting a capillary tube, a valve, and conduits connecting said last-named fitting and valve with the outlet member.

CHARLES H. COLVIN.
ADOLF URFER.